Figure 1:
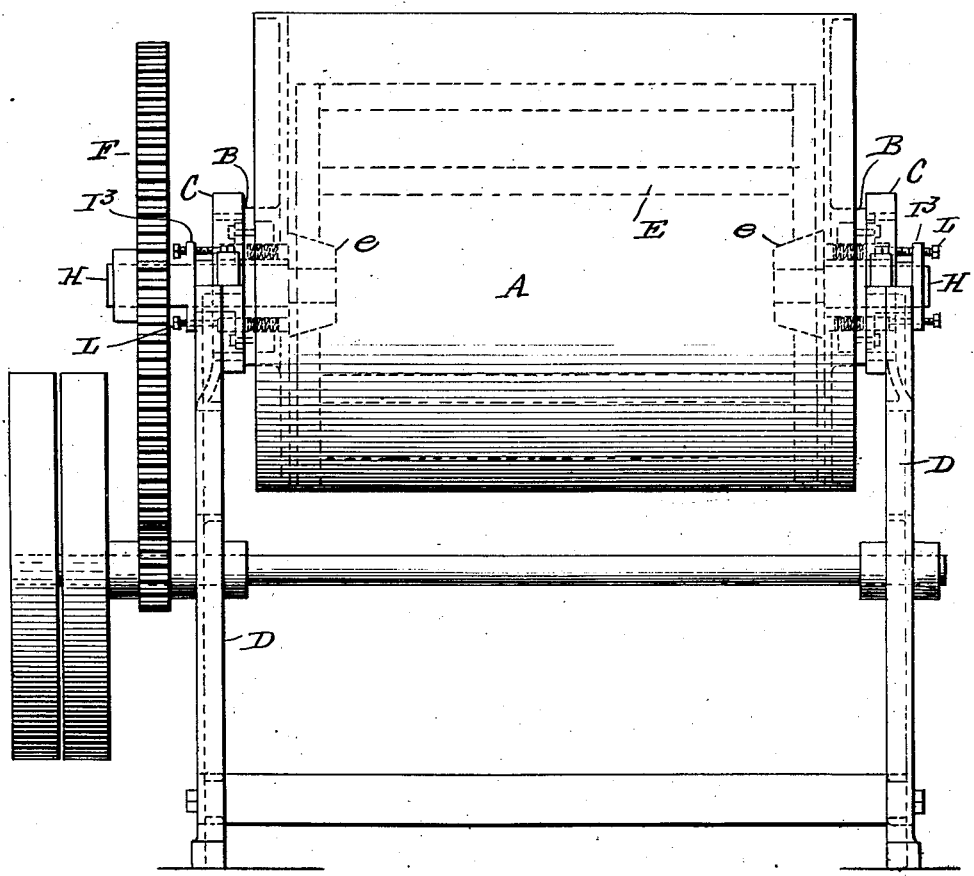

F. H. VAN HOUTEN.
DOUGH MIXING MACHINE.
APPLICATION FILED JAN. 3, 1910.

969,311.

Patented Sept. 6, 1910.
2 SHEETS—SHEET 1.

Witnesses
Elizabeth Griffith
Halbert P. Burns

Inventor
Frank H. Van Houten
By Church & Church
his Attorneys

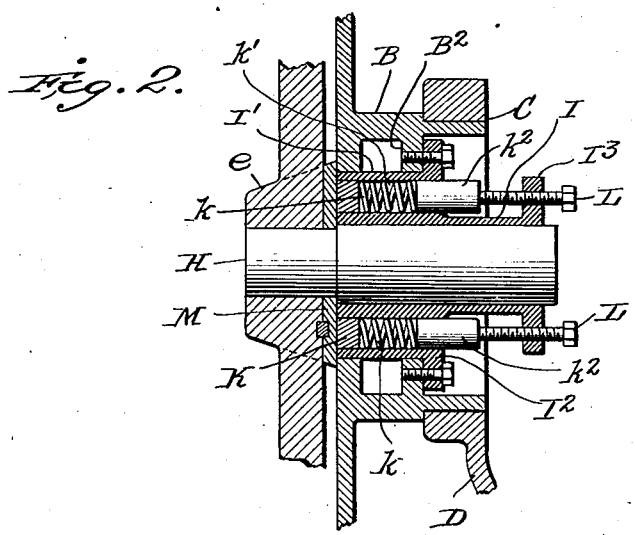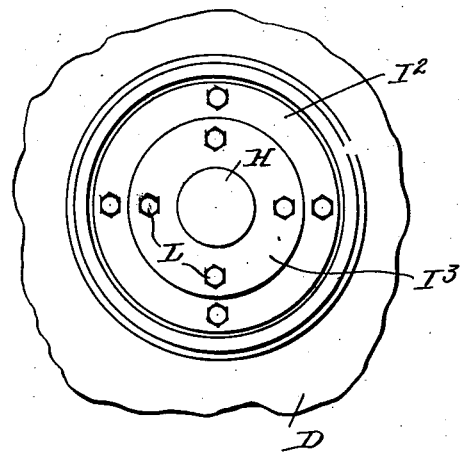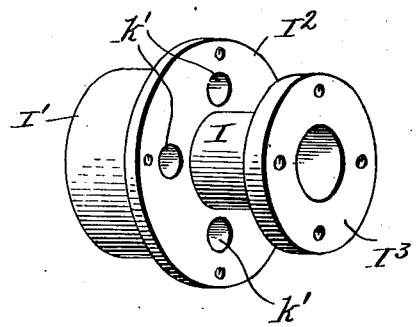

UNITED STATES PATENT OFFICE.

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-MIXING MACHINE.

969,311.      Specification of Letters Patent.      Patented Sept. 6, 1910.

Application filed January 3, 1910. Serial No. 536,072.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Dough-Mixing Machines; and I do hereby declare the following to be a full, clear, and exact description of the same, reference being had to the accompanying drawings, forming a part of this specification, and to the figures and letters of reference marked thereon.

This invention relates to machines designed for the mixing of dough in the making of bread, the objects of the invention being to improve the construction and arrangement of the parts whereby the bearings are protected from the action of the salt or other ingredients being mixed, the cleansing of the working faces facilitated and means provided for taking up wear.

The invention consists in certain novel details of construction and combinations and arrangements of parts, all as will be now described and pointed out particularly in the appended claims.

In the accompanying drawings—Figure 1 is an elevation of a mixing machine embodying the present improvements; Fig. 2 is a vertical section on an enlarged scale through a portion of one end of the same; Fig. 3 is an elevation of the parts shown in Fig. 2 omitting the bearing for the trough or mixing chamber; and Fig. 4 is a perspective view of one of the removable bushings or bearings for the mixing blades.

Like letters of reference in the several figures denote the same parts.

The trough or mixing chamber A in general form and appearance is similar to those in common use, and at the ends is provided with large trunnions B journaled in bearings C in the frame D. The trough is adapted to be turned in its bearings for discharging the batch of dough by the usual or preferred mechanism not shown and within the trough is a mixing blade or blades E of approved form. The mixing blades are conveniently rotated by gearing F driven by ordinary pulley and belt connections.

In the preferred construction the mixing blades have hubs $e$ from which short shafts H project for supporting the blade, said shafts being journaled in removable bearings mounted in the trunnions B.

One of the removable bearings is shown in Figs. 2, 3 and 4 from which figures it will be seen that the central bearing sleeve I has at its inner end an enlargement I' and at the outer end of the enlargement a flange $I^2$. When in place in the trunnion the flange $I^2$ overlies and is bolted to the flange $B^2$ of the trunnion.

The inner face of the enlargement I' is provided with an annular recess for the reception of a ring K preferably of brass and adapted to be held advanced by springs $k$ located in chambers $k'$ in the enlargement and kept under compression by plungers $k^2$. The plungers $k^2$ are adjusted by screws L threaded in a flange $I^3$ on the outer end of the bearing. A wear plate M also preferably of brass is interposed between the hub of the mixing blades and bearing in position to receive the thrust of the ring K, said plate being mounted in such manner as to rotate with the blades.

With the construction described, a tight working joint is maintained between non-corroding surfaces at points on the inner sides of the supporting bearings and, consequently, salty or corrosive substances cannot gain access to, or escape from the bearings. The wear will be slight, but such as does occur is taken up by the advance of the ring. It is a simple and easy matter to remove a bearing either for the substitution of a new bearing, or for the insertion of a new packing or wear ring at the inner side of the bearing.

Having thus described my invention, what I claim as new and desire to secure by Letters Patent of the United States is—

1. A dough mixing machine embodying a frame, a trough having supporting trunnions at the ends journaled in the frame, outwardly removable bearings mounted concentrically in said trunnions and extending through to the inside of the trough, and a mixing blade having journals at opposite ends supported in said bearings.

2. A dough mixing machine embodying a frame, a trough having supporting trunnions at the ends journaled in the frame and provided with inwardly projecting flanges, bearings mounted in said trunnions and having outwardly extending flanges, bolts uniting said flanges whereby the bearings may be removed outwardly, and a mixing blade having journals at opposite ends supported in said bearings.

3. In a dough mixing machine, the combination with the frame, and the trough having large end trunnions journaled in the frame, of outwardly removable bearings mounted in the trunnions, spring pressed rings mounted in the inner faces of the bearings, a mixing blade having journals in said bearings and carrying wear plates with which said rings contact around the journal to prevent access of material to said journal from within the trough.

4. In a dough mixing machine, the combination with the frame and the trough having large end trunnions journaled in the frame, of bearings removably mounted in the trunnions, rings concentric with the bearings mounted in the inner faces of the bearings, springs for advancing said rings, screws for adjusting the compression of the springs, a mixing blade having journals located in the bearings and wear plates carried by the blade and against which the rings bear to prevent access of material to the journals from the interior of the trough.

5. In a dough mixing machine, the combination with the trough having the annular trunnions at the ends and the mixing blade having end journals, of the bearings for the journals removably mounted in the trunnions and projecting through to the inside of the trough, rings movably mounted in the inner face of the bearings and surrounding the journals, springs for advancing said rings to prevent access of material to the journals from within the trough and screws held by the bearings for compressing said springs.

FRANK H. VAN HOUTEN.

Witnesses:
CLAUDE VAN NOSTRAN,
J. M. VAN HOUTEN.